July 8, 1930.  A. ARUTUNOFF  1,769,933
MULTISTAGE BEARING
Filed Jan. 19, 1927   2 Sheets-Sheet 1
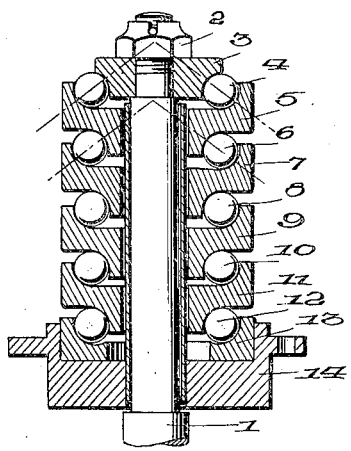
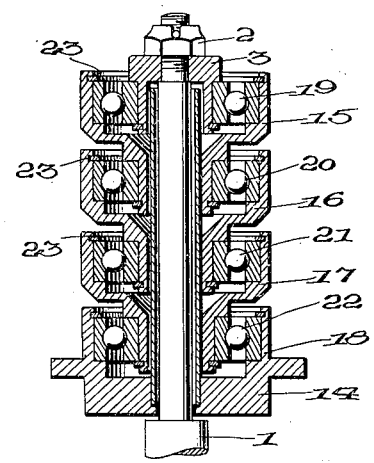
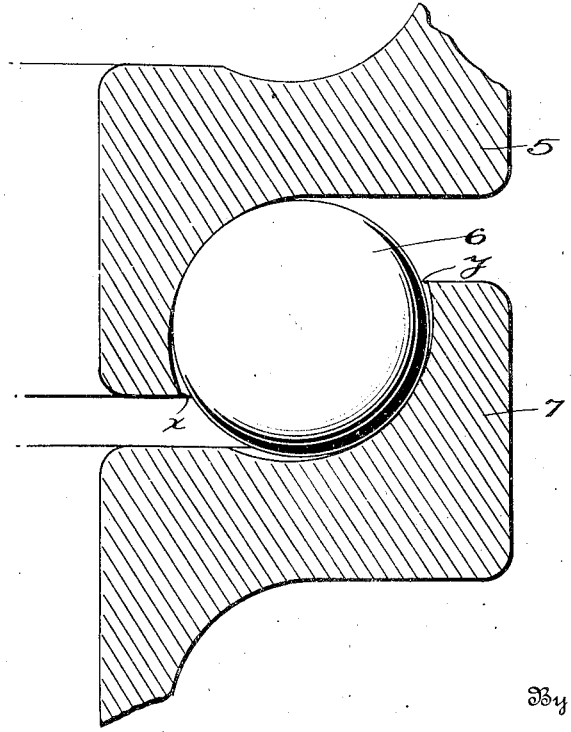
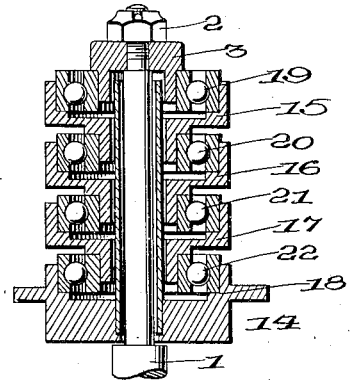
Inventor
A. ARUTUNOFF,
By George A. Purcell
Attorney

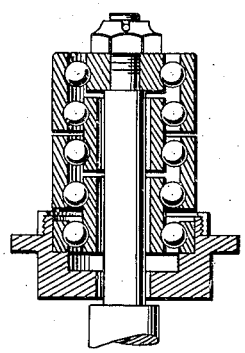
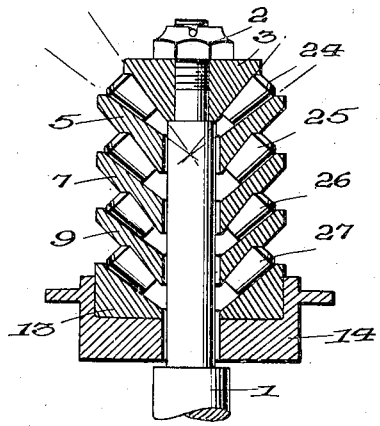
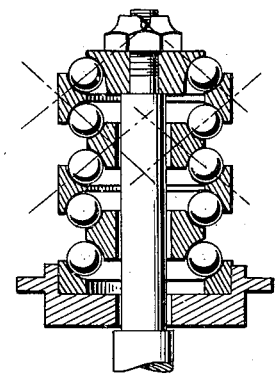

Patented July 8, 1930

1,769,933

UNITED STATES PATENT OFFICE

ARMAIS ARUTUNOFF, OF LOS ANGELES, CALIFORNIA, ASSIGNOR TO REDA PUMP COMPANY, OF BARTLESVILLE, OKLAHOMA, A CORPORATION OF DELAWARE

MULTISTAGE BEARING

Application filed January 19, 1927. Serial No. 162,135.

My invention consists in new and useful improvements in multistage bearings and relates particularly to thrust bearings.

Heretofore, ball bearings of the known type, although being practical for many purposes, were not practical for use where a high speed is involved. Centrifugal force which increases friction has always been a great handicap to the endurance of the bearings, but the greatest handicap is that neither balls nor races are able to withstand the large number of alternating stresses per time unit. The best materials available for use in the manufacture of bearings have their limits in endurance, and the friction and stresses encountered by multistage bearings has always had a tendency, in time, to wear out the members.

It is the object of my invention to overcome these difficulties, and to this end, I provide means for reducing the number of alternating stresses to a minimum by rolling one bearing on another in such a way that not only the advantages of multistaging are present, but the further advantages of reducing the speed and friction by my particular design and construction of the race members.

I accomplish this result by connecting the outer race of one row of rolling members to the inner race of the adjacent row of rolling members.

A further advantage of my invention is that my improved bearing is not only effective as a thrust bearing, but also for combined thrust and radial loads, retaining the shaft in the true center of the bearing seat as long as a thrust load is present.

With the above and other objects in view which will appear as the description proceeds, my invention consists in the novel features herein set forth, illustrated in the accompanying drawings and more particularly pointed out in the appended claims.

Referring to the drawings in which numerals of like character designate similar parts throughout the several views, Fig. 1 is a cross section of the preferred form of my invention showing in detail the construction of the bearing races with intermediate rows of balls.

Fig. 2 is an enlarged view of a portion of Fig. 1 showing in detail the retaining feature of the races for keeping the assembled parts together.

Fig. 3 is a modification of the principle shown in Fig. 1, covering the use of standard type ball bearings by means of race retainers adapted to withstand thrust from either direction.

Fig. 4 is a modification similar to Fig. 3, wherein the retainers are adapted to withstand thrust in one direction only.

Fig. 5 is a further modification of my invention as shown in Fig. 1, covering the use of roller bearings.

Figs. 6 and 7 are still further modifications.

In the drawings, referring to Fig. 1, 1 designates the shaft, the outer end of which is adapted to receive a nut or other suitable locking means 2, to secure the bearing member 3 on said shaft. 4 represents the top row of rolling members or balls, 5 an intermediate race member comprising integral outer and inner races for the top row of balls 4 and the adjacent row of balls 6 respectively. 7, 9 and 11 designate intermediate race members similar to that just described as 5, for the respective adjacent rows of balls 8, 10 and 12. 13 represents the stationary bearing member, and 14 the bearing seat.

It will be noted from an examination of Fig. 1, that the adjacent balls and races are so arranged that a straight line drawn through the outer and inner points of contact of each ball with its respective races, will merge in an apex centering at the axis of rotation of the shaft 1, thus securing perfect rolling action to reduce friction and alternating stresses to a minimum.

With this construction it will be apparent that a gearing down action is accomplished not only by the multistage arrangement, but by means of transmitting the higher speed of the outer races to the adjacent inner races of smaller diameter.

Referring now to the detail view of the race members and balls in Fig. 2, it will be seen that the lip $x$ of the inner race, and the lip $y$ of the outer race are extended toward one another to points within the diameter of the balls 6, the lip *x* projecting a greater distance beyond the center of the balls in one direction, than the lip *y* does in the opposite direction.

Thus when the bearing is assembled, the members are adapted to be shaped into position and retained in place by the wedging action of the lips *x* and *y* upon the balls. The lip *x*, as before stated, extending a greater distance beyond the center of the ball in one direction than the lip *y* in the opposite direction, will grip the ball and cause the same to be wedged against the lip *y*.

To disassemble the bearing, the device is reversed (with respect to the position shown in the drawings), and the elements are released from the wedge action, due to the fact that the lip *y* being shorter than the lip *x*, clears the periphery of the balls, before causing the same to wedge against the lip *x*, and the members may be easily slipped apart after the nut 2 is removed.

The modification shown in Fig. 3 comprises retainers 15, 16, 17 and 18, the latter being integral with the bearing seat 14, for the balls and races 19, 20, 21 and 22 respectively of the conventional type, the same principle for gearing down being employed, namely, the transmitting of the high speed of the outer race member to the lower speed of the inner race member of the adjacent balls.

To enable this bearing to withstand thrust in either direction, I provide a locking means 23 near the upper extremity of each of the race retainers.

The modification shown in Fig. 4 is quite similar to that just described, with the exception that the locking members 23 of the former are not employed, thus, this type of bearing is adapted to withstand thrust in only one direction.

Referring to Fig. 5, it will be noted that in place of the ball bearings 4, 6, 8, 10 and 12 (Fig. 1), I have employed roller bearings, 24, 25, 26 and 27, the general principle of the construction and operation of the bearing being the same.

From the foregoing, it is believed that my invention may be clearly understood without further description, it being borne in mind that numerous changes may be made in the details of construction without departing from the spirit of the invention as set out in the appended claims.

What I claim and desire to secure by Letters Patent is:

1. A multistage bearing comprising a plurality of rolling members and race members arranged in superposed, coaxial series, each of said race members being of equal diameter and consisting of an outer and inner race for the adjacent rolling members respectively, said rolling members being equi-distant from the axis of said bearing.

2. A multistage bearing comprising a plurality of rolling members and race members arranged in superposed coaxial series, each of said race members consisting of an outer and inner race for the adjacent rolling members respectively, and being so constructed as to permit unit handling, whereby all members are retained in their respective positions regardless of fastening means.

3. A multistage bearing comprising a plurality of rolling members and intermediate rotating members arranged in superposed coaxial series, each of said intermediate members being adapted to retain an outer and inner race for the adjacent rolling members respectively, said rolling members and rotating members being respectively arranged in vertical alignment.

4. A multistage bearing comprising a plurality of rolling members and race members arranged in coaxial series, each of said race members consisting of an outer and inner race for the adjacent rolling members respectively, each of said races having an inwardly extending lip, the lateral distance between circles described by the inner edges of said lips and perpendicular to the axis, being less than the diameter of any of said rolling members.

5. A multistage bearing comprising a plurality of rolling members and race members arranged in coaxial series, said race members being arranged end to end and each consisting of an outer race and an inner race for the adjacent rolling members respectively, said outer races having overhanging lips to confine the rolling members, and said inner races having underlying lips to confine said rolling members, whereby when one of the end race members is moved axially, the rolling members will engage the lips and cause all of the other race members to partake of the same movement.

6. A multistage bearing comprising a plurality of rolling members and race members arranged in coaxial series, said race members being arranged end to end, and each consisting of an outer race and an inner race for the adjacent rolling members respectively, said outer races having radial lips, the edges of which describe a circle of smaller circumference than a circle described by the inner surface of said lips at a point further down, and said inner races having radial lips, the edges of which describe a circle of greater circumference than a circle described by the inner surface of said lips at a point further up.

7. A bearing as claimed in claim 4, wherein the lips of the inner races extend a greater distance in one direction beyond the center of the rolling members, than the lips of the outer races of the adjacent race members in the opposite direction.

8. A multistage bearing comprising a plurality of rolling members and race members arranged in coaxial series, said rolling members and race members being respectively in vertical alignment, an end bearing member and a seat at the opposite extremity of said series, said end bearing member being adapted to rotate with the shaft, said series being adapted to slow down the velocity of said rotating member on the shaft to the zero velocity of said seat, with a minimum deformation of balls and races, by means of transferring the high speed of the outer races to the low speed of the inner races of the intermediate rotating members.

In testimony whereof I affix my signature.

ARMAIS ARUTUNOFF.